S. W. WHITE.
Baker and Roaster.

No. 205,224. Patented June 25, 1878.

WITNESSES  
Chas. J. Gill  
Jno. D. Patten

INVENTOR  
Silas W. White  
By his Atty's  
Cox and Cox

UNITED STATES PATENT OFFICE.

SILAS W. WHITE, OF PENSACOLA, FLORIDA.

IMPROVEMENT IN BAKERS AND ROASTERS.

Specification forming part of Letters Patent No. 205,224, dated June 25, 1878; application filed May 22, 1878.

*To all whom it may concern:*

Be it known that I, SILAS W. WHITE, of Pensacola, in the county of Escambia and State of Florida, have invented a new and useful Improvement in Bakers and Roasters, of which the following is a specification, reference being had to the accompanying drawings.

The invention relates to an improved baker and roaster; and consists in the devices hereinafter set forth and claimed.

Figure 1:
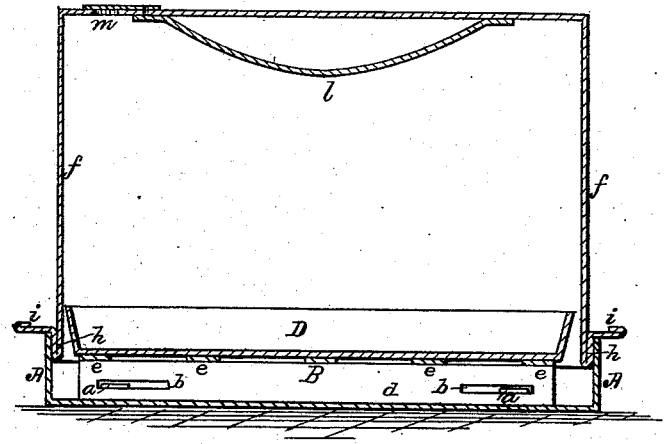
Figure 2:
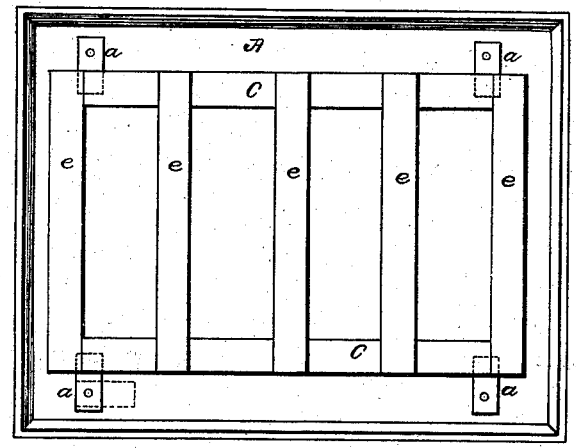
Figure 3:
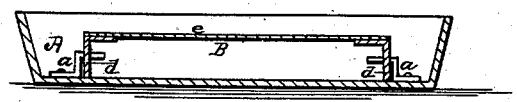

Figure 1 is a central vertical longitudinal section of a device containing an incorporation of the elements of the invention. Fig. 2 is a top view of the lower pan and broiler. Fig. 3 is a central vertical transverse section of same.

In the accompanying drawings, A represents the lower pan, which is provided at suitable points upon its upper surface with the buttons $a$, the upper ends of which, when turned inward, enter the slots $b$, cut in the sides of the broiler B, and thus hold it in position. It is obvious, however, that when the movement of the buttons $a$ is reversed the broiler can be removed at will.

The broiler B consists of the two bars C, having side flanges $d$, and connected by a suitable number of cross-pieces, $e$, the side flanges $d$ serving as a support for the broiler and to elevate it above the bottom of the pan A.

Heretofore broilers have been secured in the pan in various ways, one of which is to strap to the upper surface of the pan a bar having its ends bent upward and then outward, which ends enter apertures in the side flanges of the broiler, and thus retain it in place; but this plan is defective, since it requires a lateral movement of the broiler within the pan to free it from the fastening, and to provide for this lateral movement the broiler has to be constructed of much less width than the pan, and is consequently too narrow for successful use.

Upon the broiler B may, if desired, be placed the pan D, for receiving the article to be cooked; but it is manifest that while this may enhance the result obtained, it can be omitted if preferred, and the viand placed directly upon the broiler.

Over the pan D and broiler B, and resting upon the rim of the pan A, is placed the cover $f$, the lower edges of which are bent upward against and then outward at right angles from the sides of the said cover, forming a doubled edge, $h$, and a horizontal flange, $i$, entirely around the same.

When the cover $f$ is in position the edge $h$ enters the pan A, closely impinging its sides, while the flange $i$ rests upon the upper edges of same, thus constructing, as nearly as possible, an air-tight joint.

If the lower pan A should be too large to snugly receive the edge $h$, it is evident that the flange $i$, being at right angles to the sides of the cover $f$, instead of being turned sharply downward or formed into a simple beading, would take up the surplus space and prevent the escape of steam or the sinking of the cover into the pan. An ordinary beading around the lower edge of the pan would not accomplish this result, but would also sink down into the pan.

To the lower surface of the ceiling of the cover $f$ is secured an inverted cone or plate, $l$, having a convex surface, the apex of which is centrally above the lower pan. This inverted cone or convex plate may occupy the whole superficies of the said ceiling, or only the central portions thereof, as desired, and is used to conduct the steam arising and condensing upon the cover back to the center of the lower pan. Thus none of the aroma or nutriment of the article being cooked is lost, nor is it at all liable to burn, since the constant dripping of the condensed steam from the plate $l$ serves to baste it.

It is plain that the steam condensing upon the plate $l$ will trickle down to its apex, and thence fall upon the article being cooked.

The cover $f$ is supplied with a vent, $m$, to permit the escape of gas and steam, when desired.

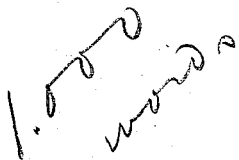

What I claim as my invention, and desire to secure by Letters Patent, is—

1. In a baker and roaster, the pan A, having pivotally secured at suitable points upon its upper surface the buttons $a$, in combination with the broiler B, consisting of the two bars C, having side flanges $d$, in which are cut the slots $b$, all arranged substantially as and for the purpose set forth.

2. As an improved baker and roaster, the cover $f$, provided with the double edge $h$, horizontal flange $i$, and convex plate $l$, in combination with the pan A, supplied with the pivotally-secured buttons $a$, and with the broiler B, having the side flanges $d$ and slots $b$, substantially as set forth.

In testimony that I claim the foregoing improvement in bakers and roasters, as above described, I have hereunto set my hand this 21st day of May, 1878.

SILAS W. WHITE.

Witnesses:
CHAS. C. GILL,
MARTIN CONNOLLY.